(12) United States Patent
Rossetti

(10) Patent No.: US 7,474,900 B2
(45) Date of Patent: Jan. 6, 2009

(54) METHOD FOR PAGING IN A WIRELESS NETWORK BASED ON QUALITY OF SERVICE

(75) Inventor: David A. Rossetti, Randolph, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 433 days.

(21) Appl. No.: 11/241,888

(22) Filed: Sep. 30, 2005

(65) Prior Publication Data

US 2007/0077947 A1 Apr. 5, 2007

(51) Int. Cl.
*H04Q 7/20* (2006.01)

(52) U.S. Cl. .............. 455/458; 455/456.1; 455/452.2; 370/328; 370/332

(58) Field of Classification Search .......... 455/458, 455/456.1, 452.2; 370/328, 332
See application file for complete search history.

(56) References Cited

U.S. PATENT DOCUMENTS

| | | | |
|---|---|---|---|
| 6,597,904 B1 * | 7/2003 | Neustein | 455/406 |
| 7,277,392 B2 * | 10/2007 | Venteicher et al. | 370/237 |
| 2003/0017842 A1 * | 1/2003 | Moles et al. | 455/552 |
| 2004/0043772 A1 * | 3/2004 | Quirke et al. | 455/456.1 |
| 2004/0157626 A1 * | 8/2004 | Park et al. | 455/458 |
| 2004/0254980 A1 * | 12/2004 | Motegi et al. | 709/203 |

* cited by examiner

*Primary Examiner*—Danh C Le

(57) ABSTRACT

A method is provided for locating an access terminal using paging. The method comprises selecting one of a first and second paging scheme based on a quality of service associated with the access terminal. That is, a resource intensive paging scheme may be employed to locate access terminals that have been assigned a relatively high quality of service, and a slower, less resource intensive, paging scheme may be used when the access terminal has a relatively low quality of service.

6 Claims, 4 Drawing Sheets

METHOD FOR PAGING IN A WIRELESS NETWORK BASED ON QUALITY OF SERVICE

BACKGROUND OF THE INVENTION

1. Field of the Invention

This invention relates generally to a communications system, and, more particularly, to a wireless communications system.

2. Description of the Related Art

In wireless communications systems or networks, wireless devices typically move throughout the network communicating with one base station and then another, as their location and signal quality dictates. While the device is actively communicating, the network inherently "knows" the device's location, and thus, how best to communicate with it. There are, however, occasions when a device is not actively communicating with the network. At these times, the network only "knows" the location of the base station with which the device last communicated, and that the device may have moved relative to the last "known" location. When data needs to be delivered to the device, the network generally locates the device by systematically issuing paging signals from various likely base stations, and then awaiting a response from the user. Once a base station sufficiently near the "missing" device issues a paging signal, the user will respond, thereby locating the "missing" device.

Different strategies have been suggested for locating such a "missing" user. Typically, these strategies have three competing interests: 1) efficient resource allocation; 2) effectiveness at locating the device, and latency in locating the device. For example, latency may be enhanced by using a large amount of resource, such as by issuing paging signals from a large number of base stations at the same time. The more resources used, the quicker the "missing" user is likely to be located; however the use of resources may be inefficient. Alternatively, only a small group of base stations that are most likely to be near the "missing" user may issue paging signals. If the device is not in the vicinity of these base stations, then the paging attempt will not be effective. Alternatively, the search may be iteratively expanded, recruiting the next most likely group of base stations, until the "missing" user is located. This type of paging scheme is likely to be effective at locating the user using substantially less resources, but the time required is likely to be longer. Users may perceive the extended search period as reduced Quality of Service (QoS).

In some wireless systems, a registration methodology is used to give the network knowledge of the device location. Since these networks typically have many idle users, to maximize capacity of the system these registrations are engineered to occur as rarely as possible while still supporting the paging strategy. The registration strategy is inter-related with the paging strategy.

The present invention is directed to overcoming, or at least reducing, the effects of, one or more of the problems set forth above.

SUMMARY OF THE INVENTION

In one embodiment of the present invention, a method is provided for locating an access terminal. The method comprises selecting one of a first and second paging scheme based on a quality of service associated with the access terminal.

In another embodiment of the present invention, a method is provided for locating an access terminal. The method comprises selecting one of a first and second paging scheme based on a type of service associated with the access terminal.

In another embodiment of the present invention, a method is provided for locating an access terminal. The method comprises selecting one of a first and second paging scheme based on recent history of transactions with the access terminal.

In another embodiment of the present invention, a method is provided for locating an access terminal. The method comprises selecting one of a first and second paging scheme based on the priority of the subscriber.

In another embodiment of the present invention, a method is provided for locating an access terminal. The method comprises selecting one of a first and second paging scheme based on system loading.

In another embodiment of the present invention, a method is provided for locating an access terminal. The method comprises selecting one of a first and second paging scheme based on a combination of the Quality of Service, Type of Service, recent history of transactions, priority of the subscriber, and system loading.

In another embodiment of the present invention, a method is provided for delivering services to an access terminal. The method comprises selecting pre-paged delivery or direct delivery based on a combination of the Quality of Service, Type of Service, recent history of transactions, priority of the subscriber, and system loading.

BRIEF DESCRIPTION OF THE DRAWINGS

The invention may be understood by reference to the following description taken in conjunction with the accompanying drawings, in which like reference numerals identify like elements, and in which.

Figure 1:
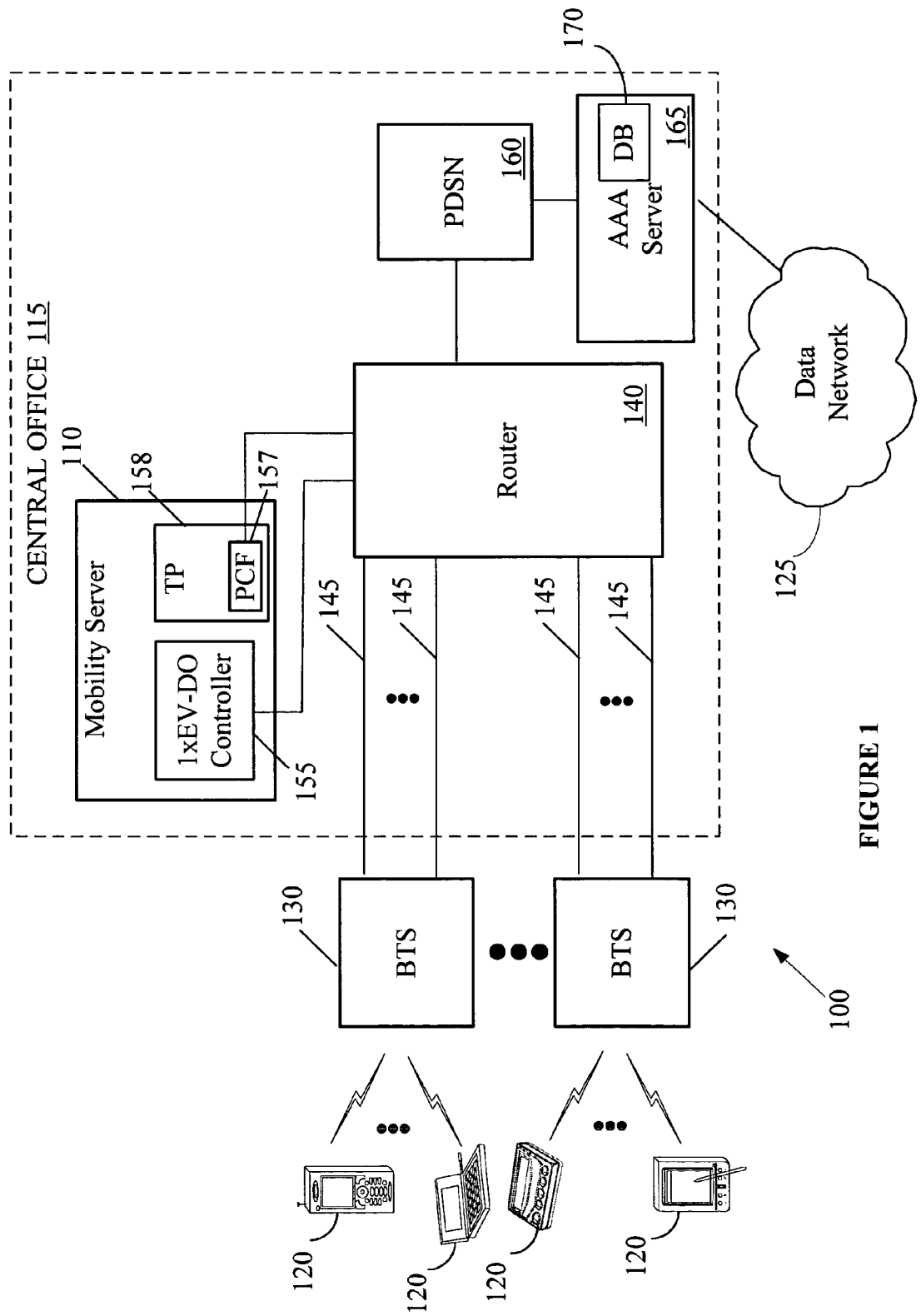
FIG. 1 is a block diagram of a data communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is a 1xEV-DO system, although it should be understood that the present invention may be applicable to other systems that support data and/or voice communication. The communications system 100 includes a mobility server 110 located at a central office 115 that allows one or more access terminals 120 to communicate with a data network 125, such as the Internet, through one or more base stations (BTS) 130. The access terminal 120 may include one of a variety of devices, including cellular phones, personal digital assistants (PDAs), laptops, digital pagers, wireless cards, and any other device capable of accessing the data network 125 through the BTS 130.

In one embodiment, each BTS 130 may be coupled to a router 140 by one or more connections 145, such as T1/E1 lines or circuits, ATM circuits, cables, and optical digital subscriber lines (DSLs).

The mobility server 110 of FIG. 1 generally provides replication, communications, runtime, and system management services. The mobility server 110, in the illustrated embodiment, includes a 1xEV-DO controller 155, and a packet control function (PCF) module 157 embedded in a traffic processor (TP) module 158. The 1xEV-DO controller 155 supports 1xEV-DO service in the communications system 100 of FIG. 1, and the traffic processor module 158 handles calling processing functions, such as setting and terminating a call path. The PCF module 157, in one embodiment, buffers data received from a packet data service node (PDSN) 160 (described below), as well as maintains data during the dormant state. The PCF module 157 may support communications through an Open R-P (A10-A11) interface, where the A10 interface may be utilized for packet traffic and the A11 interface for signaling. Because the Open R-P interface is well-known to those skilled in the art, it is not described in detail herein.

In the illustrated embodiment, the PDSN 160 is coupled between the router 140 and an authentication, authorization, and Accounting (AAA) server 165. The PDSN 160 generally establishes secure communications to the access terminal 120 through security information provided by the AAA server 165. In one embodiment, the PDSN 160 records data usage, receives accounting information from the PCF module 157 over the Open R-P (A10-A11) interface, correlates the data to generate the accounting information, and relays the correlated information to the AAA server 165. The PDSN 160 may also maintain a serving list and a unique link layer identifier for the access terminals 120. The AAA server may also include a subscriber database 170 that maintains information, such as a QoS, regarding each of the access terminals 120. The QoS information may be used by the system to determine which of a variety of paging schemes may be used to locate a particular one of the access terminals 120. For example, if an access terminal 120 has a high QoS associated with it, then a resource intensive paging scheme may be used to insure that the access terminal 120 is quickly located. Alternatively, if the access terminal 120 has a relatively low QoS associated with it, then a paging scheme that employs relatively fewer resources may be employed.

Those skilled in the art will appreciate that while the subscriber database 170 is shown to be located in the AAA server 165 in the illustrated embodiment of the invention, it may be implanted at other locations (e.g., the PDSN 160, the mobility server 110, etc.) without departing from the spirit and scope of the instant invention.

It should be understood that the configuration of the communications system 100 of FIG. 1 is exemplary in nature, and that fewer or additional components may be employed in other embodiments of the communications system 100. For example, in one embodiment, the system 100 may include a network management system (not shown) that provides operation, administration, maintenance, and provisioning functions for a 1xEV-DO network. Additionally, the system 100 may include one or more multiplexers (not shown) connected between the BTS 130 and the router 140 for performing protocol translations. In one embodiment, the PDSN 160 may be coupled to the data network 125 without the AAA server 165. Similarly, other components may be added or removed from the communications system 100 of FIG. 1 without deviating from the spirit and scope of the invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2A:
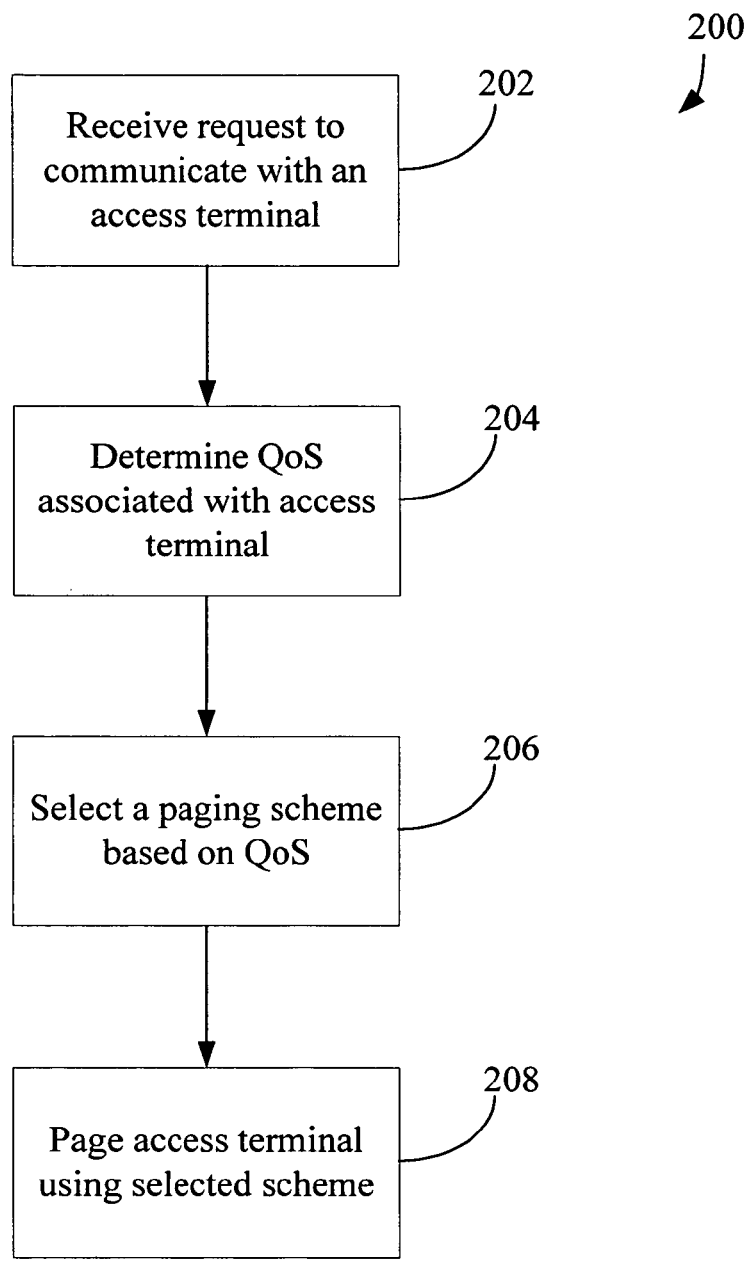
FIG. 2A depicts a flow diagram of one embodiment of a control strategy that may be implemented in the communications system of FIG. 1 to select a paging scheme based on QoS.

Referring now to FIG. 2A, a flow diagram of one embodiment of a control strategy 200 that may be implemented in the communications system 100 to select a paging scheme based on QoS is illustrated. The process begins at block 202 when a request to communicate with one of the access terminals 120 is received. The request may be generated as a result of any of a variety of applications, such as a request to initiate a voice call, a request to send an e-mail, a request to send an instant message, a request to initiate a push-to-talk session, etc. At block 204, the QoS associated with the access terminal 120 is determined, such as by accessing the database 170 in the AAA server 165. At block 206, a paging scheme or strategy associated with the QoS is selected, and then used (in block 208) to page the access terminal 120.

Different factors can be used to determine the paging strategy to be employed. For example, in one embodiment of the instant invention a recent history of transactions with the mobile device may be collected and consulted to determine the paging strategy to be used. That is, the paging strategy may be based, at least in part, on: 1) the last seen location of the device; 2) a list of previous N last seen locations of the device; and/or 3) the time since the device was last seen. Alternatively or additionally, the paging strategy may be based, at least in part, on the type of Service being delivered (e.g., Voice or Data). Similarly, the paging strategy may use a priority of the subscriber being paged as a factor in determining the paging strategy. For data service, the paging strategy may be based on the Quality of Service (QoS) of the data flow that is to be delivered; where QoS, as it pertains to paging, may include: 1) the latency requirement for locating the device; 2) the time-to-live of the data flow; and/or 3) the precedence of the service compared to other services being offered.

The current usage or system loading may also be used as a factor in determining the paging strategy to be employed. For example, the paging strategy may consider: 1) control channel loading (common Paging & Access Channels); and/or 2) traffic channel loading (shared or dedicated bearer channels).

The strategy used to locate the mobile may be used to setup a bearer channel (e.g., a voice call or packet data bearer channel), or it can be used to deliver a single message or packet. In addition, the call/packet can be delivered by first paging to locate the mobile and then delivering the call/packet, or it can be delivered directly. The latter is less efficient, but has lower latency.

The communications system 100 can be configured such that different IP Flows of data require a different QoS. For example, the same mobile device may have a different QoS, depending on the type of IP Flow being sent. The flows are controlled using a reservation method, where the reservation needs to be opened in order to reserve network resources, and closed to free up the resources once the flow is done. Network resources could include bandwidth on the air interface, or on a backhaul interface from the base station to the core network, or internal resources to support these interfaces such as buffers and queues. The flows are identified by use of a Reservation Label.

For a given Reservation Label, one method of identifying the QoS requirements of the IP flow is through use of a ProfileID. The ProfileID is a short hand identifer (16-bits) that applies to a specific application, such as 8 kbps conversational voice. Knowing the profile ID, the network can look-up how to set up QoS Attributes for this flow. As an alternative to ProfileIDs, the mobile device and network can individually negotiate each QoS attribute. (QoS attributes would include things like data rate, latency requirements, acceptable error rate, etc).

The network (PDSN) is also configured (using a Traffic Flow Template) to determine how to recognize the IP Flow associated with a specific forward link packet. For example, a combination of Source IP Address, UDP Port, and RFC2474 Differentated Service Code Points (DSCP) can be used to identify a specific IP flow.

For the specific case of QoS paging, when a packet is received at the network for an idle mobile, the network determines the reservation label based upon the TFT characteristics. The network can then determine the profileID used by that reservation label. The network has been configured with a paging strategy based upon ProfileID. So now the network knows what paging method to use for this packet.

Figure 2B:
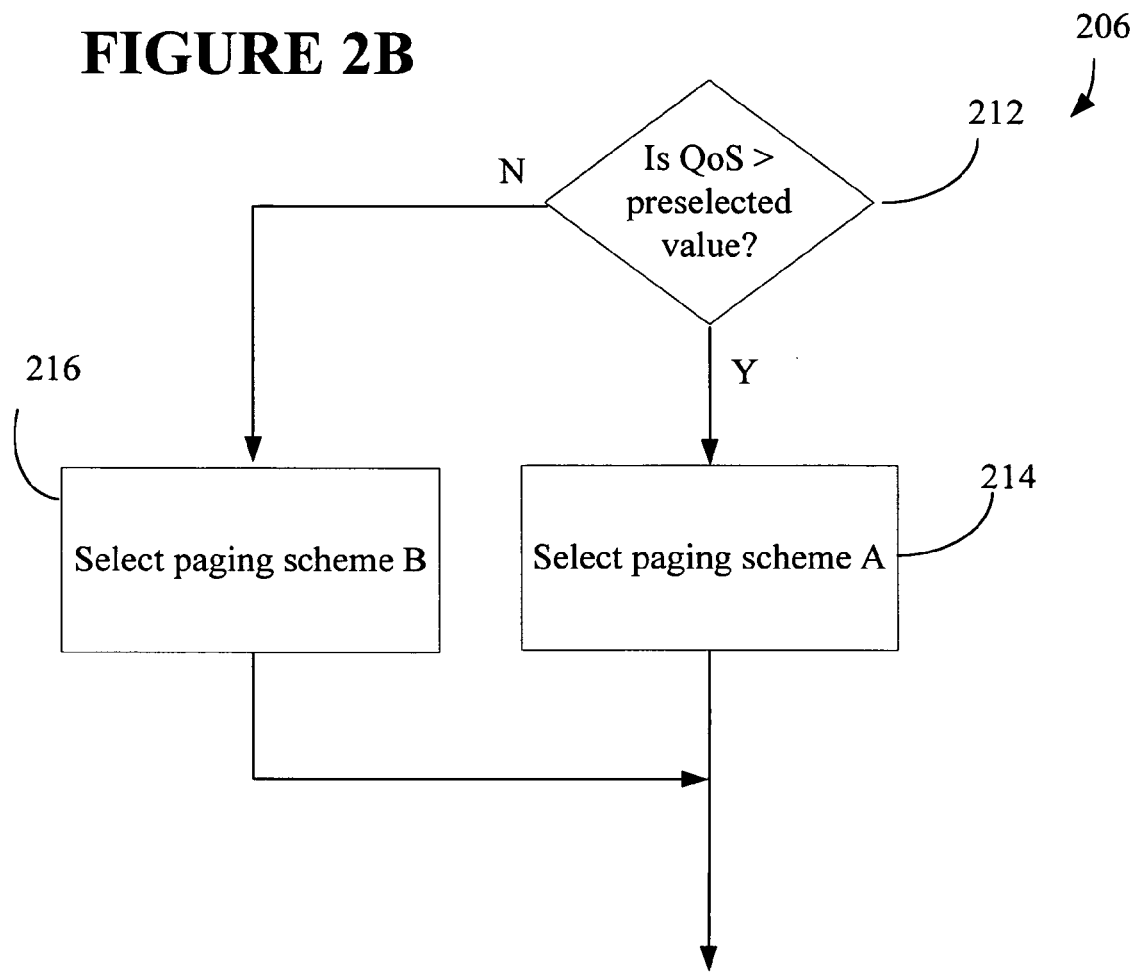
FIG. 2B is a more detailed flow diagram of one embodiment of a portion of the flow diagram of FIG. 2A.

FIG. 2B illustrates a more detailed embodiment of the block 206 in which a particular paging scheme is selected based on the QoS. In decision block 212, the QoS is compared with a preselected value. If the QoS exceeds the preselected value, then a paging scheme A is selected at block 214. For example, if the QoS associated with the access terminal 120 is higher than the preselected value, then the paging scheme A, which allocates greater resources to the paging scheme, is selected so that the access terminal 120 is likely to be located more quickly. Alternatively, if the QoS associated with the access terminal 120 is lower than the preselected value, then the paging scheme B, which allocates fewer resources to the paging scheme, is selected, allowing the access terminal 120 to likely to be located at a slower rate.

Those skilled in the art will appreciate that alternative embodiments of the instant invention may employ a greater number of paging schemes that may be selected based on the QoS falling above or below additional preselected setpoints. Further, those skilled in the art will appreciate that the allocation of more resources to paging scheme A may involve using more base stations to deliver the initial paging signals, rebroadcasting the paging signals more often and at a faster rate, and/or broadcasting the paging signals for a longer period of time. Generally, it should be considered that more resources are employed in the paging scheme if it makes it more likely that the access terminal 120 will be located more quickly or more reliably.

Figure 3:
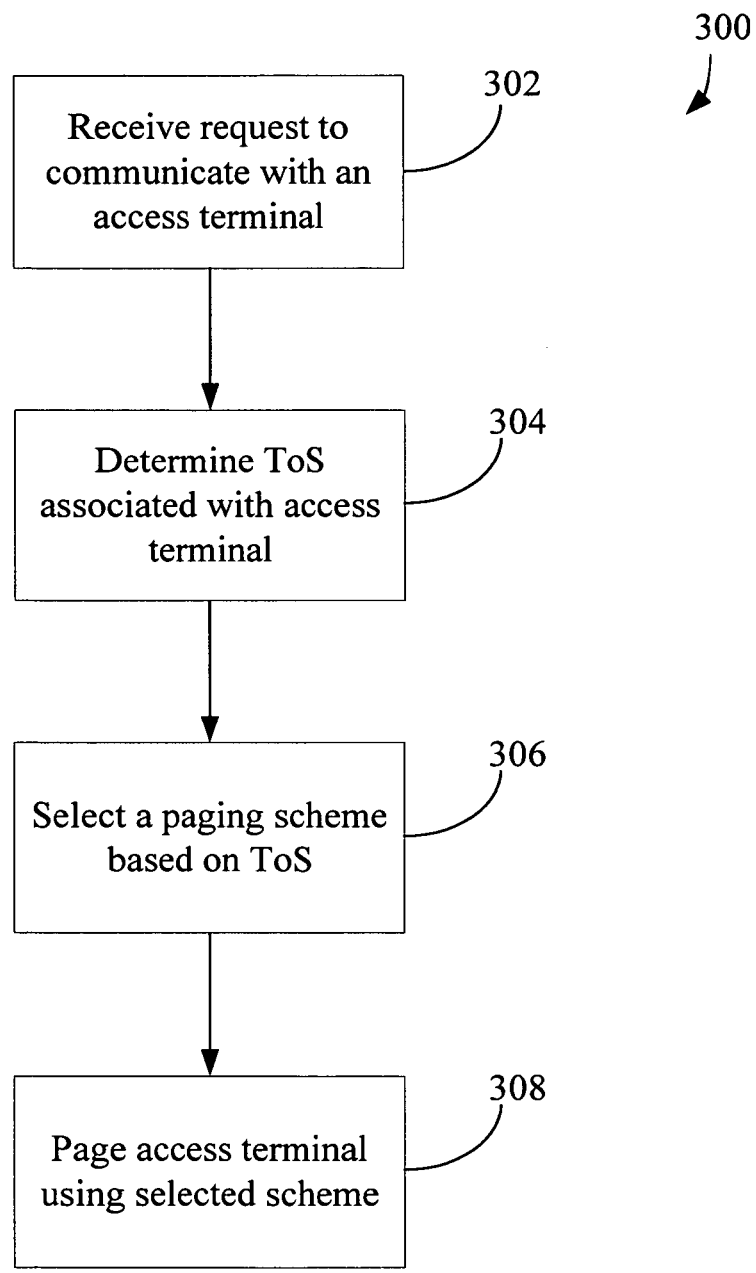
FIG. 3 depicts a flow diagram of one embodiment of a control strategy that may be implemented in the communications system of FIG. 1 to select a paging scheme based on type-of-service (ToS).

Turning now to FIG. 3, a flow diagram of one embodiment of a control strategy 300 that may be implemented in the communications system of FIG. 1 to select a paging scheme based on type-of-service (ToS) is illustrated. In particular, the process begins at block 302 when a request to communicate with one of the access terminals 120 is received. The request may be generated as a result of any of a variety of applications, such as a request to initiate a voice call, a request to send an e-mail, a request to send an instant message, a request to initiate a push-to-talk session, etc. At block 304, the QoS associated with the access terminal 120 is determined, such as by accessing the database 170 in the AAA server 165. In this embodiment, each of the access terminals 120 may have multiple entries in the database 170 to correspond to the multiple applications or types-of-service (TOS) that may be performed by the access terminal 120. That is, the database 170 may include a separate QoS for a voice call, an e-mail, an instant message, a push-to-talk session, and the like. At block 306, a paging scheme associated with the QoS is selected, and then used (in block 308) to page the access terminal 120.

In the embodiment of the instant invention illustrated in FIG. 3, it may be useful to have a QoS associated with each application that may be performed by an access terminal 120. For example, it may be useful to assign a relatively high QoS to a push-to-talk application and a relatively low QoS to a voice call. In this manner, low latency applications may be assured of a faster response.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 220 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for locating an access terminal and establishing a communications session, comprising:

selecting one of a first and second paging scheme based on a characteristic associated with the communications session, wherein the first paging scheme is capable of locating the access terminal more quickly than the second paging scheme and wherein selecting one of the first and second paging schemes based on the quality of service associated with the access terminal further comprises selecting the first paging scheme in response to the quality of service associated with the access terminal being relatively high, and selecting the second paging scheme in response to the quality of service associated with the access terminal being relatively low.

2. A method, as set forth in claim 1, wherein selecting one of the first and second paging schemes based on a characteristic associated with the communications session further comprises selecting one of the first and second paging schemes based on a quality of service associated with the communications session.

3. A method, as set forth in claim 1, wherein selecting one of the first and second paging schemes based on a characteristic associated with the communications session further comprises selecting one of the first and second paging schemes based on a type of service associated with the communications session.

4. A method, as set forth in claim 1, wherein the first paging scheme employs more resources than the second paging scheme and wherein selecting one of the first and second paging schemes based on the quality of service associated with the access terminal further comprises selecting the first paging scheme in response to the quality of service associated with the access terminal being relatively high, and selecting the second paging scheme in response to the quality of service associated with the access terminal being relatively low.

5. A method for locating an access terminal, comprising:

selecting one of a first and second paging scheme based on a quality of service associated with the access terminal, wherein the first paging scheme is capable of locating the access terminal more quickly than the second paging scheme and wherein selecting one of the first and second paging schemes based on the type of service associated with the access terminal further comprises selecting the first paging scheme in response to type of service associated with the access terminal having a relatively low latency and selecting the second paging scheme in response to the type of service associated with the access terminal having a relatively high latency.

6. A method, as set forth in claim 5, wherein the first paging scheme employs more resources than the second paging scheme and wherein selecting one of the first and second paging schemes based on the quality of service associated with the access terminal further comprises selecting the first paging scheme in response to the type of service associated with the access terminal having a relatively low latency, and selecting the second paging scheme in response to the type of service associated with the access terminal having a relatively high latency.

* * * * *